Patented Aug. 14, 1945

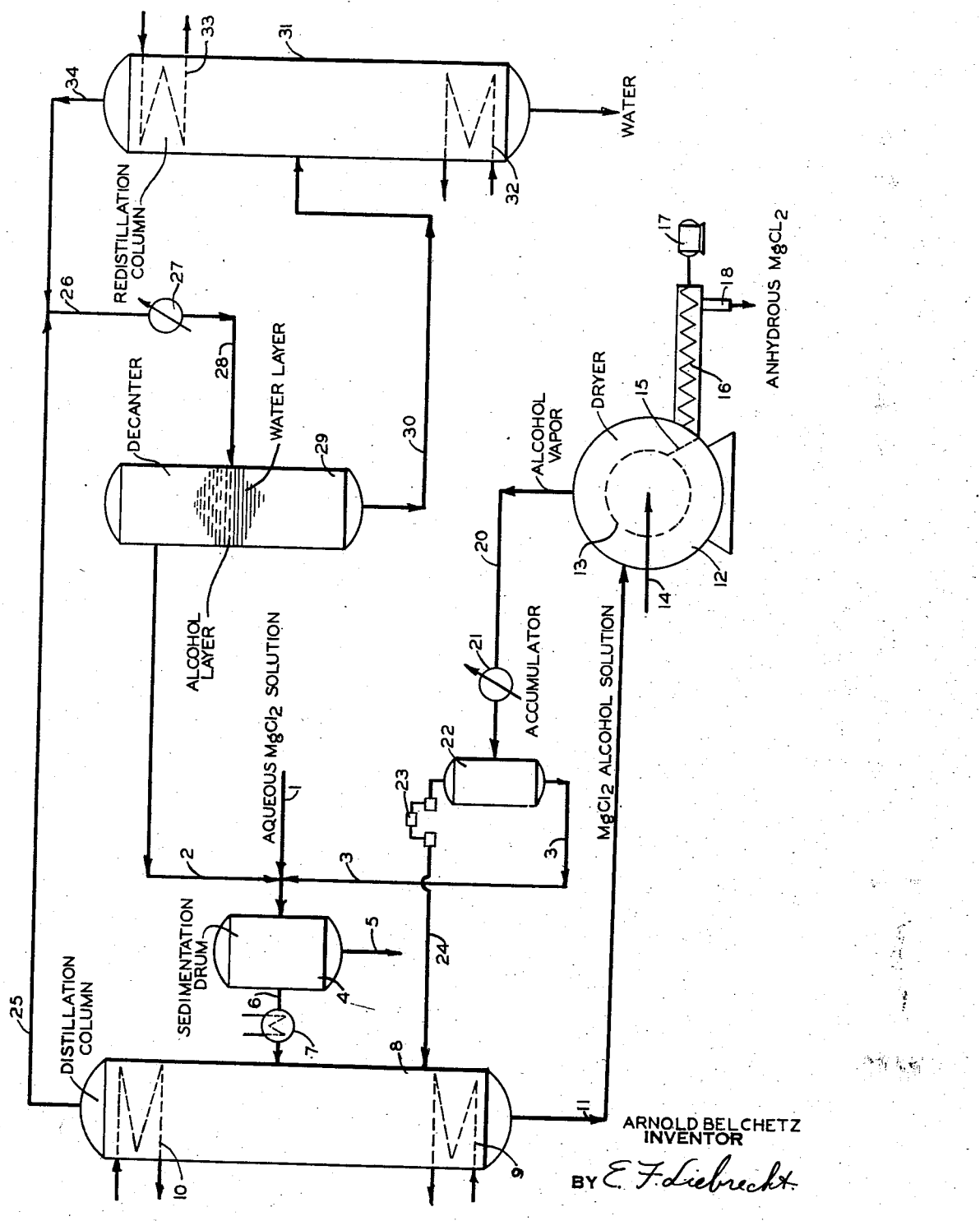

2,381,994

UNITED STATES PATENT OFFICE 2,381,994

PRODUCTION OF ANHYDROUS MAGNESIUM CHLORIDE

Arnold Belchetz, Kew Gardens, N. Y., assignor to The M. W. Kellogg Company, Jersey City, N. J., a corporation of Delaware Application November 21, 1941, Serial No. 419,987

19 Claims. (Cl. 23—91)

This invention relates to the preparation of anhydrous magnesium chloride from hydrous forms thereof. The principal object of the invention is to provide an economical and commercially practicable method of preparing a pure anhydrous salt, and while not limited thereto, the invention may be employed with particular advantage in preparing a pure anhydrous magnesium chloride for use in the electrolytic manufacture of metallic magnesium.

Magnesium chloride is very soluble in water, and crystallizes therefrom as a hexahydrate, $MgCl_2.6H_2O$, which is deliquescent. The latter substance, containing about 53 per cent water, cannot be dehydrated further by simple heating without substantially complete decomposition, the basic salt $Mg_2OCl_2$ and the hydroxide $Mg(OH)_2$ being formed with the liberation of hydrochloric acid. By spray drying a hot saturated magnesium chloride solution, a product containing about 26 per cent water and corresponding approximately to a dihydrate $(MgCl_2.2H_2O)$ can be obtained. Material produced in this way is contaminated with about 1 per cent $Mg(OH)_2$ as a result of partial hydrolysis.

The electrolytic process for the manufacture of metallic magnesium involves passing a current of electricity through a cell containing a molten mixture of magnesium chloride, KCl and NaCl, the latter two substances being present for the purpose of lowering the melting point of the magnesium chloride. The cell temperature is usually about 1300° F., and it is not feasible to add magnesium chloride to the cell as hexahydrate, because decomposition to the oxide would immediately occur. By forming briquettes of the dihydrated salt prepared as described above, however, and dropping them directly into the molten electrolyte at 1300° F., a flash evaporation of the remaining 26 per cent water is effected whereby only about 2 to 3 per cent more of the magnesium chloride is decomposed into HCl and MgO. The presence of the later substance in the cell causes some difficulty, because it forms a sludge which must be drawn off as it accumulates. The attendant formation of hydrochloric acid is much more troublesome, however, not only because of the danger of corrosion, but also for the reason that it contaminates the chlorine which is a valuable by-product of the electrolysis. As will be readily understood, therefore, the art has long sought a commercially practicable method of producing absolutely anhydrous magnesium chloride.

I have now discovered a relatively inexpensive and efficient large scale method of completely dehydrating any of the various hydrous forms of magnesium chloride, whereby a product of high purity is obtained. The method of my invention involves heating a hydrous form of magnesium chloride with a volatile non-aqueous liquid in which anhydrous magnesium chloride is soluble, to distill off water with vapors of the liquid and leave a non-aqueous solution of magnesium chloride as the distillation residue. Separation of solid anhydrous salt from the non-aqueous solution is thereafter accomplished by vaporizing the solvent.

The non-aqueous solvents which I prefer to use in practicing my invention are the saturated monohydroxy aliphatic alcohols, and more specifically those alcohols of the latter type having atmospheric boiling points between 220° and about 350° F. In the following further description of an exemplary embodiment of the invention, with reference to the annexed drawing, the use of such an alcohol will be assumed. As will be understood by those familiar with distillation processes, however, other solvents can be used.

The annexed drawing is a diagrammatic flow sheet of an exemplary embodiment of the invention, wherein items of equipment are conventionally shown and from which self-evident necessaries such as pumps, valves and the like have been omitted for greater clarity.

The operating step to be first described is essentially a distillation, and could, if desired, be carried out as a batch operation. For greatest efficiency, however, it is preferable to employ continuous fractionating equipment and to supply the feed in the form of a hot aqueous solution of magnesium chloride containing the minimum amount of water; that is, to supply $$MgCl_2.6H_2O$$

dissolved in little more than its own water of crystallization. Such a solution may be obtained from a more dilute one by conventional evaporation methods, or in other ways depending upon the original source of the magnesium chloride.

In the drawing, an aqueous magnesium chloride solution is taken from any available source and introduced into line 1. An alcohol-water mixture derived from a subsequent step of the process is introduced into line 1 through line 2, and anhydrous alcohol derived from still another step of the process is introduced into line 1 through line 3. The magnesium chloride, water and alcohol solution thus formed in line 1 is passed into a sedimentation drum 4 wherein any salts such as sodium chloride, sodium sulfate, etc., which may have been present as impurities dissolved in the initial magnesium chloride solution are precipitated and settled out by reason of their insolubility in dilute alcohol. Sediment is periodically drawn off as it may accumulate in the drum 4, by means of line 5, and rejected from the process as waste. If desired, the small amount of alcohol accompanying the withdrawn slurry is recovered by evaporation and returned to the process. It will be seen that my method of preparing pure anhydrous magnesium chloride has the advantage initially of accomplishing the removal of soluble salts such as are likely to be associated with magnesium chloride obtained by fractional crystallization of brines. In fact, when the source of magnesium chloride is a mixture of dissolved salts, little or no purification thereof prior to dehydration may be required other than that provided by the above-mentioned precipitation. The sedimentation drum 4 is alternatively replaced by a filter if desired.

Magnesium chloride - water - alcohol solution from which insoluble impurities have been removed is passed via line 6 to a preheater 7 wherein it is heated preferably to its boiling point. It is then introduced into the mid-section of a distillation column 8. The latter can be of conventional design, embodying fractionating bubble trays, baffles, packing or the like. A steam heated reboiler coil 9 is situated in the base of column 8 and a water cooled reflux condensing coil 10 is located at the top.

In column 8 the liquid portion of the feed is fractionated into absolute alcohol as the higher-boiling bottom product and a constant-boiling mixture of water and alcohol as the lower-boiling top product. The magnesium chloride, being non-volatile, remains in the liquid flowing down through the column and is withdrawn in an anhydrous condition, dissolved in absolute alcohol, by means of line 11. This solution is passed as indicated into an evaporator or dryer 12 of the enclosed, internally heated drum type, and is therein sprayed onto a drum 13 which is constantly and slowly rotated by any suitable mechanism acting through a hollow shaft passing through a stuffing box in the side wall of the outer shell of the dryer. Steam or other suitable heating medium supplied through line 14 is passed through drum 13 via its hollow carrying shaft and it is thereby heated to a temperature high enough to vaporize the alcohol in the solution being sprayed onto it. The construction of the dryer is exemplary only, and as such devices are well known to the art, extensive explanation of their operation is not necessary herein.

As alcohol is vaporized and driven off from the liquid sprayed on to the rotating drum 13, a skin or layer of anhydrous magnesium chloride is left, and this is removed continuously by a scraper blade 15 riding on the surface of the drum. The dry material thus produced, by a suitable mechanical arrangement such as screw conveyor 16 driven by motor 17, is removed from the interior of the dryer and disposed of as desired via product outlet 18.

Alcohol vapors evolved in the drying operation pass off from the drum housing through line 20 and are recovered as a liquid by cooling and condensation in condenser 21. The thus-condensed anhydrous alcohol is collected in accumulator 22 and passed via line 3 for re-admixture with additional quantities of magnesium chloride solution, as previously described.

In order to permit the evaporation of alcohol from the magnesium chloride solution in dryer 12 at the lowest possible temperature, and thus to inhibit the slight tendency of the salt to react with certain of the alcohols which may be used, I may, when it is advantageous to do so, maintain the drying and recovery system under reduced pressure. To this end I exhaust vapors from accumulator 22 by means of compressor 23 and by means of line 24 return the compressed vapors to the base of column 8. Alternatively, I may introduce an inert gas into the dryer to lower the partial pressure of the alcohol vapors and carry them off more rapidly. In the latter event, of course, compression of the vapors from the dryer is necessary prior to condensation of the alcohol therefrom, and the inert gas remaining uncondensed is suitably recycled to the dryer.

Under certain circumstances, as when the final anhydrous product is desired in molten rather than in pulverulent form, I remove only enough alcohol from the solution supplied to the dryer to produce a solid product, which, however, still contains some alcohol. I then finish drying the solid so obtained, and melt it, by passing it through a conventional heated rotary kiln dryer and discharging it at an elevated temperature.

Returning to the distillation column 8 for a description of remaining features of this embodiment of the invention, it will be understood that the function of the reboiler coil 9 and the vapor-liquid contact in the lower portion of the column is to expel all water from the feed mixture, so as to make possible the withdrawal of an anhydrous alcohol solution as bottom product. As the water is vaporized and expelled from the feed mixture, there is inevitably a substantial vaporization of alcohol also, and the function of the upper section of the column and the reflux-condensing coil 10 is to prevent, as far as possible, the escape of alcohol with the water in the overhead vapors. It so happens that those alcohols which I prefer to employ in practising my invention all form constant-boiling mixtures with water; that is to say, in distilling mixtures of these alcohols with water, it is not possible to produce both anhydrous alcohol and alcohol-free water from any one alcohol-water mixture. If the mixture to be distilled contains more water (less alcohol) than the constant-boiling mixture, then it will not be possible to produce anhydrous alcohol as a product. The alcohol will be concentrated to the proportion in which it exists in the constant-boiling mixture, and the excess water will be produced as a bottom product, free from alcohol if the fractionation is sufficiently precise. If on the other hand the mixture contains less water (more alcohol) than the corresponding constant-boiling mixture, then anhydrous alcohol may be withdrawn as a bottom product and the constant-boiling mixture will be the top product, providing sufficiently precise fractionation is effected. Inasmuch as the latter situation necessarily must obtain in practising my invention, i. e., anhydrous alcohol must be one of the distillation products, it is necessary to add to the initial magnesium chloride solution that quantity of alcohol which will be distilled off with the water to be removed, in a constant-boiling mixture. Also, it is necessary to add alcohol in excess of the latter quantity, to act as a solvent for the anhydrous magnesium chloride and prevent it from being left as a solid when the water and the first quantity of alcohol are distilled off. Unless the column is provided with refluxing facilities, however, the overhead product will be richer in alcohol than the corresponding constant-boiling mixture, and hence a greater quantity of alcohol would in such an event have to be added to the feed. With the higher-boiling alcohols the excess which would be thus necessitated would not be great, and in any case the refluxing may be omitted if desired. If no reflux is used the feed may be introduced into the top of the column, instead of at a lower point. It will be understood that even when reflux is used, the column must contain a sufficient number of plates or the like if fractionation of excess alcohol from the top product is to be effected.

While I do not wish to be bound by any theory offered herein in explanation of the efficacy of my invention, it is believed that the mechanism of water-removal in accordance with the invention is as follows:

When a hydrous form of magnesium chloride dissolves in a non-aqueous solvent, the bond of association between the magnesium chloride and the water is weakened, and there is a lessened tendency for the magnesium chloride to ionize; hence, water can be expelled from the solution by heating and distillation without the occurrence of hydrolysis. It is to be noted that while a volatile solvent contributes to the ease with which the water is removed, by its stripping effect, this in itself is insufficient to account for the avoidance of hydrolysis. Otherwise, it would be possible to achieve equally good results by using reduced pressure, in place of the volatile solvent, to facilitate the vaporization of water at a low temperature. Complete dehydration of magnesium chloride cannot be accomplished without decomposition simply by heating it under vacuum.

Referring now again to the drawing, the top of the column is maintained by the cooling effect of reflux coil 10 at the boiling point of the constant-boiling mixture of alcohol and water which constitutes the overhead product of the distillation. The column overhead vapors are passed through line 25 into line 26 and are cooled suitably to about 100° F. and liquefied in a condenser 27, the condensate being then passed through line 28 to a settler or decanter 29. In the latter vessel, a further property of the preferred alcohols manifests itself. The solubility of these alcohols in water varies between individual members from about 1 per cent to about 4 per cent at 100° F. and the corresponding solubilities of water in the alcohols varies from about 12 per cent to less than 10 per cent. Hence, in the decanter 29 there will be a separation of the condensate into two layers, the upper layer being mostly alcohol and the lower layer mostly water. As the water layer contains less water than the constant-boiling mixture, it is possible as hereinbefore explained to separate it by fractionation into alcohol-free water as a bottom product and constant-boiling mixture as a top product. The lower layer is therefore drawn off through line 30 and rectified in redistillation column 31. Reboiler heat is supplied to column 31 by steam-heated reboiler coil 32, the bottom temperature being substantially the boiling point of water, 212° F. The top of the redistillation column is again maintained at the boiling point of the constant-boiling mixture by means of water cooled reflux condensing coil 33. Vapors from column 31 pass through line 34 to be combined with vapors from column 8 in line 26, whence they travel in admixture one with the other through the condensation and decantation steps.

The upper layer of liquid in decanter 29 will at 100° F. consist of a mixture of roughly 90 per cent alcohol and 10 per cent water, and it is this liquid which is passed through line 2 to be introduced into the feed line 1. It will be understood that the anhydrous alcohol recovered from the dryer and returned through line 3 supplies that proportion of alcohol necessary to act as a solvent for the anhydrous magnesium chloride, and that alcohol is recovered by decantation in quantity sufficient for the removal of water from the aqueous feed. There are thus two closed continuous alcohol cycles. Unavoidable small losses of alcohol from the system are made up by periodic additions, but otherwise the process is self-contained as to the water-removing medium.

The water-removing capacity of the alcohol-rich liquid supplied to the feed line from the decanter is proportional to the difference between the percent water in that liquid and the percent water in the constant-boiling mixture. The former figure will be, as previously stated, not far from ten per cent at 100° F. for all the preferred alcohols. The latter figure ranges from about 32 per cent up to 50 per cent and higher, whence it will be seen that the alcohol saturated with water from the decanter will in all cases have a water-removing capacity not far below that of the absolute alcohol. It is entirely feasible and within the scope of the invention to produce absolute alcohol from the upper layer in the decanter by a single extra stage of fractionation, the alcohol being obtained in such an event as a bottom product, and constant-boiling mixture being obtained as a top product for condensation and return to the decanter. Absolute alcohol so obtained may then be introduced into the feed line in lieu of the 90 per cent alcohol employed in the described embodiment of the invention. In such a case a smaller total volume of liquid would have to be introduced and a smaller volume of vapors taken overhead. These small economies are not in the usual case sufficient to justify the expense of an additional stage of fractionation, however.

While I have shown and described an embodiment of my invention wherein the water-removinging distillation is accomplished with maximum efficiency, it is to be understood that less efficient arrangement can be operated to obtain a satisfactory product. For example, it is possible within the scope of the invention to charge solid $MgCl_2.6H_2O$ into a shell or pot still lacking any fractionating devices whatsoever, add a sufficient quantity of alcohol, either all at once or gradually as the subsequent distillation proceeds, and to distill off all the water from the hydrate, leaving the latter in an alcohol solution. Solution of the solid crystalline material initially charged takes place as it is heated with the alcohol to distillation temperature. The quantity of alcohol required to be distilled per pound of water removed is much greater in the absence of any fractionation, and therefore the shell still method is less advantageous. Recovery of the alcohol by decantation is possible with this method, however, just as in the embodiment shown in the drawing.

It is to be understood that the invention is not limited to evaporation as a method of separating anhydrous magnesium chloride from a non-aqueous solvent solution, as it is feasible in some cases to add a precipitant, such as carbon disulfide, which is miscible with alcohol but incapable of dissolving magnesium chloride. Also, I may use any suitable method of evaporation, including spray drying.

Referring now in somewhat greater detail to the solvents which may be used in practising the invention, it will be understood that for maximum efficiency a solvent should possess a substantial capacity to dissolve magnesium chloride. The normally liquid homologs of methanol are outstanding in this respect, but the lower-boiling members of the group are characterized by low water-removing ability. In the case of methanol, for example, the tendency of the solvent is to distill off in preference to the water, and the more effective the fractionation the less the water content of the distillate vapors. Ethanol is only slightly less subject to this tendency, as it forms a constant-boiling mixture containing about 4 per cent water. In order for either of these alcohols to be effective, they must be supplied to the distillation in anhydrous condition and in inordinately large quantity. Since both are completely miscible with water, neither can be recovered in a sufficiently water-free condition by simple decantation.

The propyl and butyl alcohols, except for normal and iso-butanol, are only slightly better than methanol and ethanol in water-removing ability, and while some of these are partially immiscible with water, none of them forms an alcohol layer containing less water than the corresponding constant-boiling mixture. With all the latter alcohols, except for the two noted above, it is necessary to resort to azeotropic distillation or chemical dehydration to recover them in sufficiently water-free condition for recycling to the distillation. Moreover, the propyl and lower alcohols apparently form alcoholates with magnesium chloride in which the tenacity of their attachment to the salt is comparable to that of water itself. Hence, their removal by evaporation is extremely difficult.

I particularly prefer the amyl alcohols or pentanols as solvents. Hexyl alcohols can be used but because of their generally higher cost are not conducive to an economical operation. Exemplary operating conditions will now be given for the use of iso-amyl alcohol in the previously shown and described embodiment of the invention. The significant properties of iso-amyl alcohol are as follows:

1. Its boiling point is 267° F.
2. It forms a constant boiling mixture with water consisting of about 58 per cent alcohol and about 42 per cent water, and having a boiling point of 203° F.
3. It dissolves water to the extent of about 10 per cent by weight at 100° F.
4. It is soluble in water to extent of about 2 per cent by weight at 100° F.
5. It will dissolve upwards of 16 per cent by weight of magnesium chloride at its boiling point.

Referring now again to the drawing, with iso-amyl alcohol as the solvent the top temperatures of columns 8 and 31 should be maintained at 203° F. The bottom temperature of column 8 will, because of the boiling point raising effect of the dissolved magnesium chloride on the alcohol, be higher than 267° F. in any case and will depend upon how nearly saturated a solution is desired to be withdrawn. It is preferable to use sufficient excess alcohol in the lower alcohol recycle circuit to avoid any possibility of crystallization in line 11 or the base of column 8. Inasmuch as with iso-amyl alcohol the alcohol layer taken from the decanter will contain 10 per cent water and the distillate vapors will contain 42 per cent water, each pound of alcohol supplied to the column from the decanter will be capable of carrying overhead about 0.6 pounds of water in addition to that which enters with it, assuming efficient fractionation.

My invention is not limited to any of the embodiments described herein for illustrative purposes, but only in and by the following claims, wherein I wish to claim all novel features of my invention.

I claim:

1. In a method of preparing anhydrous magnesium chloride from hydrous forms thereof, the improvement which comprises heating a hydrous form of magnesium chloride with a volatile non-aqueous magnesium chloride solvent which is substantially unreactive with water and distilling off mixed vapors of all the water in said hydrous magnesium chloride and said solvent while forming a solution of magnesium chloride in said solvent.

2. In a method of preparing anhydrous magnesium chloride from hydrous forms thereof the improvement which comprises heating a hydrous form of magnesium chloride with a normally liquid monohydroxy saturated aliphatic alcohol and distilling off mixed vapors of all the water in said hydrous magnesium chloride and alcohol while forming a solution of magnesium chloride in said alcohol.

3. A method of preparing anhydrous magnesium chloride from magnesium chloride hexahydrate which comprises dissolving said hexahydrate in a normally liquid monohydroxy saturated aliphatic alcohol, distilling the thus-produced solution to drive off water therefrom and leave a liquid distillation residue consisting of anhydrous magnesium chloride dissolved in alcohol, and separating anhydrous magnesium chloride from said liquid residue.

4. A method of preparing anhydrous magnesium chloride from an aqueous solution thereof which comprises mixing said solution with a normally liquid monohydroxy saturated aliphatic alcohol and distilling off all water from the mixture together with a portion of the alcohol and thereby forming an anhydrous solution of magnesium chloride in alcohol, and then evaporating said anhydrous solution to recover anhydrous magnesium chloride free from alcohol.

5. A method of preparing anhydrous magnesium chloride from an aqueous magnesium chloride solution which comprises introducing said solution into a distillation zone, introducing a normally liquid monohydroxy saturated aliphatic alcohol into said zone, supplying heat to said zone to vaporize and distill water and alcohol therefrom, withdrawing an anhydrous solution of magnesium chloride in alcohol from said zone, separating alcohol from the anhydrous magnesium chloride in the withdrawn solution and returning the separated alcohol to the distillation zone, condensing the vapors distilled from said zone and returning the alcoholic content of the condensate to the distillation zone.

6. A method of preparing anhydrous magnesium chloride which comprises heating a hydrous form of magnesium chloride with a normally liquid monohydroxy saturated aliphatic alcohol boiling above 220° F. and distilling off all the water in said hydrous material in admixture with vapors of said alcohol, thereby forming an anhydrous solution of magnesium chloride in said alcohol, and then separating anhydrous magnesium chloride from said alcohol.

7. In a method of preparing anhydrous magnesium chloride from hydrous forms thereof, the improvement which comprises heating a hydrous form of magnesium chloride with a normally liquid monohydroxy saturated aliphatic alcohol boiling above 220° F. and distilling off mixed vapors of water and alcohol while forming a solution of magnesium chloride in said alcohol.

8. A method of preparing anhydrous magnesium chloride from magnesium chloride hexahydrate which comprises dissolving said hexahydrate in a normally liquid monohydroxy saturated aliphatic alcohol boiling above 220° F., distilling the thus-produced solution to drive off water therefrom and leave a liquid distillation residue consisting of a solution of anhydrous magnesium chloride in alcohol, and separating anhydrous magnesium chloride from said liquid residue.

9. A method of preparing anhydrous magnesium chloride from an aqueous solution thereof which comprises mixing said solution with a normally liquid monohydroxy saturated aliphatic alcohol boiling above 220° F. and distilling off all the water from the mixture together with a portion of the alcohol, thereby forming an anhydrous solution of magnesium chloride in alcohol, and then evaporating said anhydrous solution to recover the anhydrous magnesium chloride free from alcohol.

10. A method of preparing anhydrous magnesium chloride from an aqueous magnesium chloride solution which comprises introducing said solution into a distillation zone, introducing a normally liquid monohydroxy saturated aliphatic alcohol boiling above 220° F. into said zone, supplying heat to said zone to vaporize and distill water and alcohol therefrom, withdrawing an anhydrous solution of magnesium chloride in alcohol from said zone, separating alcohol from said anhydrous solution and returning the separated alcohol to the distillation zone, condensing the vapors distilled from said zone and allowing the condensate to separate into an alcohol-rich phase and an aqueous phase, and returning said alcohol-rich phase to said distillation zone.

11. A method as in claim 6 wherein said alcohol is an amyl alcohol.

12. A method as in claim 7 wherein said alcohol is an amyl alcohol.

13. A method as in claim 8 wherein said alcohol is an amyl alcohol.

14. A method as in claim 9 wherein said alcohol is an amyl alcohol.

15. A method as in claim 10 wherein said alcohol is an amyl alcohol.

16. A method of removing impurities from magnesium chloride which comprises forming an aqueous solution of impure magnesium chloride and adding a normally liquid monohydroxy saturated aliphatic alcohol to said solution to precipitate alcohol-insoluble impurities therefrom.

17. A method of preparing anhydrous magnesium chloride which comprises forming a relatively concentrated aqueous solution of magnesium chloride, adding to said aqueous solution a quantity of saturated monohydroxy aliphatic alcohol boiling between 220° and 350° F. to form an aqueous alcoholic magnesium chloride solution wherein the proportion of alcohol to water is substantially greater than in a constant boiling mixture of said alcohol and water, fractionalling distilling said aqueous alcoholic solution to produce an anhydrous solution of magnesium chloride in alcohol as the higher-boiling product and a mixture of alcohol and water as the lower-boiling product, allowing said lower-boiling product to separate into a lighter alcohol-rich phase and a heavier phase of low alcoholic content, evaporating and recovering alcohol from said anhydrous solution to leave anhydrous magnesium chloride free from alcohol, and using the thus-recovered alcohol and alcohol-rich phase to form additional amounts of aqueous alcoholic magnesium chloride for treatment as aforesaid.

18. A method of preparing anhydrous magnesium chloride from a hydrous form thereof containing alcohol insoluble impurities which comprises mixing said impure hydrous magnesium chloride with a normally liquid monohydroxy saturated aliphatic alcohol boiling above 220° F. to precipitate the alrohol insoluble impurities therefrom, removing said precipitated impurities, introducing the thus purified hydrous magnesium chloride together with the admixed alcohol into a distillation zone, supplying heat to said zone to vaporize and distill off all of the water in said hydrous magnesium chloride in admixture with vapors of said alcohol, withdrawing a solution of anhydrous magnesium chloride in anhydrous alcohol from said zone and then recovering the anhydrous magnesium chloride from said withdrawn solution.

19. A method of preparing anhydrous magnesium chloride which comprises heating a hydrous form of magnesium chloride with a normally liquid monohydroxy saturated aliphatic alcohol and distilling off all the water in said hydrous material in admixture with vapors of said alcohol, thereby forming an anhydrous solution of magnesium chloride in said alcohol, and then recovering magnesium chloride from said solution.

ARNOLD BELCHETZ.